United States Patent
Szabó et al.

(10) Patent No.: US 9,030,940 B2
(45) Date of Patent: May 12, 2015

(54) APPARATUS AND METHOD IN A TELECOMMUNICATIONS NETWORK

(75) Inventors: Géza Szabó, Kecskemét (HU); István Gódor, Budapest (HU); Sándor Rácz, Cegléd (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 101 days.

(21) Appl. No.: 13/634,332

(22) PCT Filed: Mar. 22, 2010

(86) PCT No.: PCT/EP2010/053723
§ 371 (c)(1),
(2), (4) Date: Oct. 22, 2012

(87) PCT Pub. No.: WO2011/116813
PCT Pub. Date: Sep. 29, 2011

(65) Prior Publication Data
US 2013/0121161 A1    May 16, 2013

(51) Int. Cl.
*H04L 1/00* (2006.01)
*H04L 12/26* (2006.01)
(Continued)

(52) U.S. Cl.
CPC ........... *H04W 28/02* (2013.01); *H04L 43/0876* (2013.01); *H04W 76/045* (2013.01)

(58) Field of Classification Search
CPC .......... H04L 43/0876–43/0894; H04W 76/045
See application file for complete search history.

(56) References Cited

U.S. PATENT DOCUMENTS 5,648,960 A * 7/1997 Sakazaki et al. ............... 370/498
6,760,303 B1 * 7/2004 Brouwer ....................... 370/229
(Continued)

FOREIGN PATENT DOCUMENTS

CN    1697545 A    11/2005
CN    101286790 A    10/2008
(Continued)

OTHER PUBLICATIONS

Armitage, G., et al., "Post-game Estimation of Game Client RTT and Hop Count Distributions", Swinburne University of Technology, Faculty of Information and Communication Technologies, Centre for Advanced Internet Architectures (CAIA) Technical Report 060801A, Oct. 30, 2006, pp. 1-8, retrieved on Jan. 5, 2015, retrieved from internet: caia.swin.edu.au/reports/060801A/CAIA-TR-060801A.pdf.

(Continued)

*Primary Examiner* — Edan Orgad
*Assistant Examiner* — Rebecca Song
(74) *Attorney, Agent, or Firm* — Coats & Bennett, PLLC

(57) ABSTRACT

An entity in a telecommunications network determines a threshold value relating to a channel switching parameter that is being used by the telecommunications network to trigger a channel switching operation, and uses this threshold value and monitored traffic information to prevent a channel change from occurring, i.e. to maintain channel occupancy. A network node is adapted to remove additional traffic that has been generated by an entity in the telecommunications network to maintain channel occupancy.

15 Claims, 9 Drawing Sheets

(51) Int. Cl.
*H04W 28/02* (2009.01)
*H04W 76/04* (2009.01)

(56) References Cited

U.S. PATENT DOCUMENTS

| | | | |
|---|---|---|---|
| 2003/0012217 A1* | 1/2003 | Andersson et al. | 370/437 |
| 2004/0165554 A1 | 8/2004 | Chao et al. | |
| 2005/0215255 A1 | 9/2005 | Tanoue | |
| 2006/0126567 A1 | 6/2006 | Chao et al. | |
| 2006/0256745 A1 | 11/2006 | Chao et al. | |
| 2007/0232339 A1 | 10/2007 | Ji et al. | |
| 2009/0257378 A1* | 10/2009 | Cuny et al. | 370/328 |
| 2010/0031036 A1* | 2/2010 | Chauncey et al. | 713/168 |
| 2010/0067400 A1* | 3/2010 | Dolganow et al. | 370/253 |

FOREIGN PATENT DOCUMENTS

| | | |
|---|---|---|
| CN | 101426234 A | 5/2009 |
| EP | 1838055 A1 | 9/2007 |
| EP | 1841145 A1 | 10/2007 |
| EP | 1898660 A2 | 3/2008 |
| GB | 2369003 A | 5/2002 |
| GB | 2404528 A | 2/2005 |
| KR | 20030025765 A | 3/2003 |
| KR | 20050046304 A | 5/2005 |
| KR | 20060025098 A | 3/2006 |
| KR | 20060042853 A | 5/2006 |
| KR | 20070045574 A | 5/2007 |
| WO | 0131948 A1 | 5/2001 |
| WO | 2004013987 A1 | 2/2004 |
| WO | 2007051578 A1 | 5/2007 |
| WO | 2009020596 A2 | 2/2009 |

OTHER PUBLICATIONS

Beigbeder, T., et al., "The Effects of Loss and Latency on User Performance in Unreal Tournament 2003", Proceedings of 3rd ACM SIGCOMM Workshop on Network and System Support for Games Aug. 30, 2004, pp. 144-151, ACM, New York, NY, US.

* cited by examiner

APPARATUS AND METHOD IN A TELECOMMUNICATIONS NETWORK

TECHNICAL FIELD

The invention relates to an apparatus and method in a telecommunications network, and in particular to an apparatus and method for maintaining channel occupancy of a communication channel.

BACKGROUND

In mobile broadband, studies have shown that subscribers use the internet in a similar manner to fixed broadband. Users often use the mobile broadband for applications such as gaming or Voice-over-Internet-Protocol (VoIP) applications.

FIG. 1 shows some of the basic components of a telecommunications network, known as the UTRAN (UMTS, Universal Mobile Telecommunications System, Terrestrial Radio Access Network). The network comprises a plurality of Radio Base Stations (RBSs) 11, each of which maintains one or more cells (not illustrated). User Equipment 13 ("UE", i.e. mobile equipment or mobile nodes) within each cell communicate with the corresponding RBS 11 of that cell. A Radio Network Controller (RNC) 15 is provided for controlling several RBSs 11.

A Serving Gateway (SGW) 17 may be connected to one or more RBSs 11, plus other nodes such as serving General Packet Radio Service (GPRS) Support Nodes (SGSNs, not shown). The SGW 17 is connected to a Packet data network GateWay (P-GW) 19. The P-GW 19 provides connectivity between the user equipment 13 and external packet data networks, such as the internet 21, by being the point of exit and entry of traffic for the user equipment.

In a network such as that described in FIG. 1, a User Equipment 13 and RBS 11 communicate by means of several different types of communication channel.

For example, in UTRAN logical channels, transport channels and physical channels exist. The logical and transport channels define what data is transported, while the physical channels define how, and with what physical characteristics, the data is transmitted.

Transport channels can be further subdivided into common transport channels and dedicated transport channels.

The common transport channel types include, amongst others, a Random Access Channel (RACH) and a Forward Access Channel (FACH). The RACH is a contention based uplink channel used for transmission of relatively small amounts of data, for example for initial access or non-real-time control or traffic data. The FACH is a common downlink channel which, as with the RACH, is only used for transmission of relatively small amounts of traffic data.

A dedicated transport channel, on the other hand, is a channel dedicated to one User Equipment for uplink and/or downlink transmissions.

In such a telecommunications network the transmitted user data is monitored, for example in a Serving Radio Network Controller (S-RNC), and evaluated to determine whether a channel switching operation should be performed from a dedicated transport channel to a common transport channel. For example, if user throughput decreases such that a switch from a dedicated transport channel to a common transport channel (e.g. FACH/RACH) is required, a down-switch request is sent to trigger a channel switching operation.

FIG. 2 shows an example of a channel switching operation between a dedicated transport channel and a common transport channel. When the throughput on the uplink and downlink falls below a first threshold value (Threshold-1) at time $t_1$ a timer is started. If the throughput increases above a second threshold value (Threshold-2) before the timer expires (for example as shown at point $t_2$), the timer is stopped and no channel switching operation is performed. However, when throughput on the uplink and downlink falls below the first threshold value (Threshold-1) at time $t_3$ and the timer started, if the throughput is still below the second threshold (Threshold-2) when the timer expires (for example as shown at point $t_4$), then a channel switching operation is triggered, i.e. from a dedicated transport channel to a common transport channel. The evaluation can be restarted when the channel switching request is issued, so that any failures during the channel switching can be detected (i.e. if the channel switch fails, a new request is issued when the restarted timer expires). The use of first and second thresholds and a timer in the example above is provided for stability reasons, and helps in preventing switching back and forth at momentary dips in throughput.

While the switching from a dedicated transport channel to a common transport channel can be advantageous in so far as any unused network resources are seized back from the user, such channel switching can be problematic in certain applications. For example, in gaming or VoIP applications the time taken to regain access to a dedicated transport channel can cause problems.

Furthermore, if a user wishes to play an online game, such as a quick action shooting game, the round trip time (RTT) of the communication link is critical in such fast pace games. A 100 ms latency will cause noticeable user experience degradation, while a 300 ms latency can make such games unplayable. One way for a user to avoid this problem is to select a server that provides the desired RTT in order to give the user an acceptable perceived quality. The RTT measurement is usually carried out by sending a plurality of data packets (also known as ping packets) towards various servers and measuring the response times, such that a server having an acceptable RTT can be selected. However, since the throughput for such ping packets is quite small, the radio link is capable of serving such ping packets on the common transport channel (i.e. RACH-FACH), which gives misleading information about the network quality to the user.

In addition, to prevent cheating several gaming applications do not allow users to join via servers having an RTT above 200 ms, since a RTT above 200 ms can be a potential risk in so far as it provides enough time for manipulating the gaming packets in real time by a third party software. Such applications do not allow players to join even if the channel switching to dedicated transport channel would eliminate the high RTT problem.

Other applications such as VoIP apply silence detection to lower the total data cost of the communication during long pauses in the data transmission. The pause in the data transmission can cause the transmitting buffers to become empty, which in turn causes the user equipment to switch from a dedicated transport channel back to a common transport channel (a RACH-FACH channel). These common transport channels do not usually provide enough capability to fulfil the requirements necessary for a good VoIP session, thus a channel switching operation back to the dedicated transport channel usually occurs when conversation is restarted after a silence period. This results in bursty packet delivery and poor voice quality.

SUMMARY

It is an object of the present invention to provide a network entity and method that help alleviate one or more of the disadvantages mentioned above.

According to a first aspect of the invention, there is provided a method for maintaining a communication channel for an entity in a telecommunications network. The method comprises the steps of determining a threshold value relating to a channel switching parameter of a channel occupied by the entity; monitoring traffic of a communication via the occupied channel; calculating, using the threshold value and the monitored traffic, what additional traffic is required to prevent the communication being switched from the occupied channel by the telecommunications network; and, adding the additional traffic to the channel comprising the communication.

The invention has the advantage of being able to influence channel switching activity from the user equipment side in order to provide an enhanced user experience for a user. For example, the invention provides an improved user experience when playing games with a predefined bandwidth, since it avoids time delays associated with changing from one channel to another. The invention also avoids problems associated with bursty packet delivery.

According to another aspect of the invention, there is provided an entity in a telecommunications network. The entity comprises: determining means adapted to determine a threshold value relating to a channel switching parameter of a channel occupied by the entity; a monitoring unit adapted to monitor traffic of a communication via the occupied channel; a processing unit adapted to calculate, using the threshold value and the current traffic, what additional traffic is required to prevent the communication being switched from the occupied channel by the telecommunications network; and an adding unit adapted to add the additional traffic to the channel comprising the communication.

According to another aspect of the invention, there is provided a traffic filter for a node of a telecommunications network. The traffic filter comprises: a detecting unit adapted to detect additional traffic on a communication channel, the additional traffic relating to traffic that is being used to maintain occupancy of the communication channel; and a filtering unit adapted to filter the additional traffic from the communication channel.

This aspect of the invention has the advantage of being able to detect additional traffic that has been generated by a user equipment to prevent channel switching, and to filter such additional traffic to avoid unnecessary use of the network bandwidth. This aspect of the invention also enhances user experience for applications such as online games, and avoids the bursty traffic associated with channel switching According to another aspect of the invention there is provided a telecommunications system comprising an entity and traffic filter as claimed in the appended claims.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

Although the embodiments below will be described in relation to influencing channel switching from a high speed communication channel, for example a dedicated transport channel, to a low speed communication channel, for example a common transport channel, it is noted that the invention is intended to be applicable more generally to influencing switching between any two communication channels. In addition, although the embodiments will be described in the context of a Universal Mobile Telecommunications System (UMTS), the invention may be used in any telecommunications or communications network.

According to a first aspect of the invention, an entity in a telecommunications network, for example a user equipment, determines a threshold value relating to a channel switching parameter that is being used by the telecommunications network to trigger a channel switching operation, and uses this threshold value and monitored traffic information to prevent a channel change from occurring, i.e. to maintain channel occupancy. Further details of the first aspect of the invention will be described in FIGS. 3 to 7 below.

According to a second aspect of the invention, a network node is adapted to remove additional traffic that has been generated by an entity in the telecommunications network to maintain channel occupancy. Further details of the second aspect of the invention will be described in FIGS. 8 and 9 below.

Figure 3:
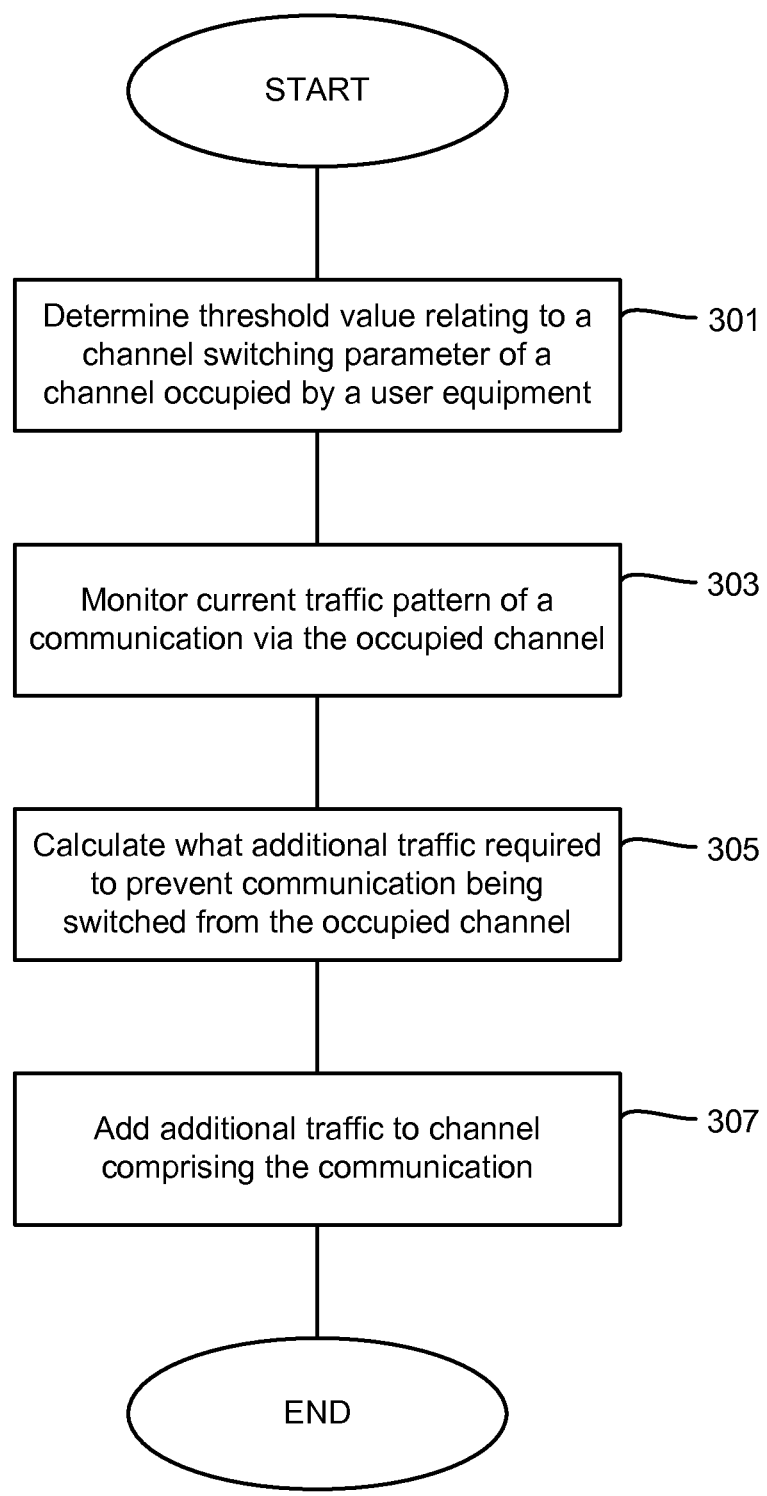
FIG. 3 shows a method according to a first embodiment.

FIG. 3 shows a method performed in a user equipment of a telecommunications network according to a first embodiment. It is noted that the method may be performed in another network entity, for example a network node that does not have knowledge of threshold values relating to channel switching parameters.

In step 301 the user equipment determines a threshold value relating to a channel switching parameter of a channel occupied by the user equipment. For example, the threshold value can relate to a throughput level that triggers a channel change operation, a period of inactivity or low throughput that triggers a channel change operation, or a combination of throughput level and time. It is noted that the invention is not limited to these examples, and is intended to cover any threshold that is related to a channel changing operation.

In step 303 the user equipment monitors traffic of a communication that is taking place via the occupied channel. The monitoring of traffic can include, but not be limited to, the monitoring of throughput on the occupied channel at a particular time, throughput over a period of time, or some other characteristic of the traffic flow, such as periods of inactivity or low throughput.

Based on the threshold value that has been determined in step 301, and the traffic monitored in step 303, the user equipment calculates what additional traffic, if any, is required to prevent communication being switched from the occupied channel, step 305.

If additional traffic is required to maintain channel occupancy, the additional traffic is added to the channel comprising the communication, step 307.

The nature or format of the additional traffic will depend on the type of threshold (or thresholds) that affect a channel changing operation by the telecommunications network. For example, if the channel switching parameter is configured to switch when a throughput level drops below a given threshold, then the additional traffic may comprise the difference between the current traffic throughput and the determined threshold level. Alternatively, if the channel switching parameter is configured to switch when a throughput level has been inactive, or below a certain threshold, for a predetermined period of time, then the additional traffic can comprise the sending of one or more bursts of additional traffic at certain intervals.

Since the user equipment determines the threshold value relating to the channel switching parameter, and monitors the traffic on the communication channel, this has the advantage of minimising the traffic load generated by the sending of additional traffic to keep the channel open during a communication session. In other words, the user equipment can be configured to send the minimum amount of additional traffic that is required to maintain channel occupancy. If desired, however, the user equipment can be configured to send a predetermined amount above the minimum that is required to maintain channel occupancy.

The traffic can be monitored in a number of ways, all of which are intended to be covered by the invention. For example, the traffic can be monitored instantaneously, and compared dynamically with the determined threshold value. Alternatively, the traffic can be monitored at regular intervals, for example every 100 ms, and at the end of each period the traffic extended to include additional traffic, as deemed necessary to meet the threshold value. Alternatively, the traffic may be monitored based on a prediction of how the traffic is going to behave, for example based on current traffic trends, or historical data that can be used to predict or estimate traffic behaviour. Other sophisticated methods of monitoring the traffic can also be used.

It is noted that the threshold value determined in step 301 of FIG. 3 may be adjusted, if desired, to provide a buffer or safety margin to ensure that the traffic level does not fall to a level that would cause a channel change. For example, the threshold value may be adjusted to allow for time taken by the system to monitor and determine that additional traffic is necessary to prevent a channel changing action, for example by using a slightly larger threshold value.

The threshold value relating to the channel switching parameter may be determined in one of a number of ways, examples of which will be described below.

Figure 4:
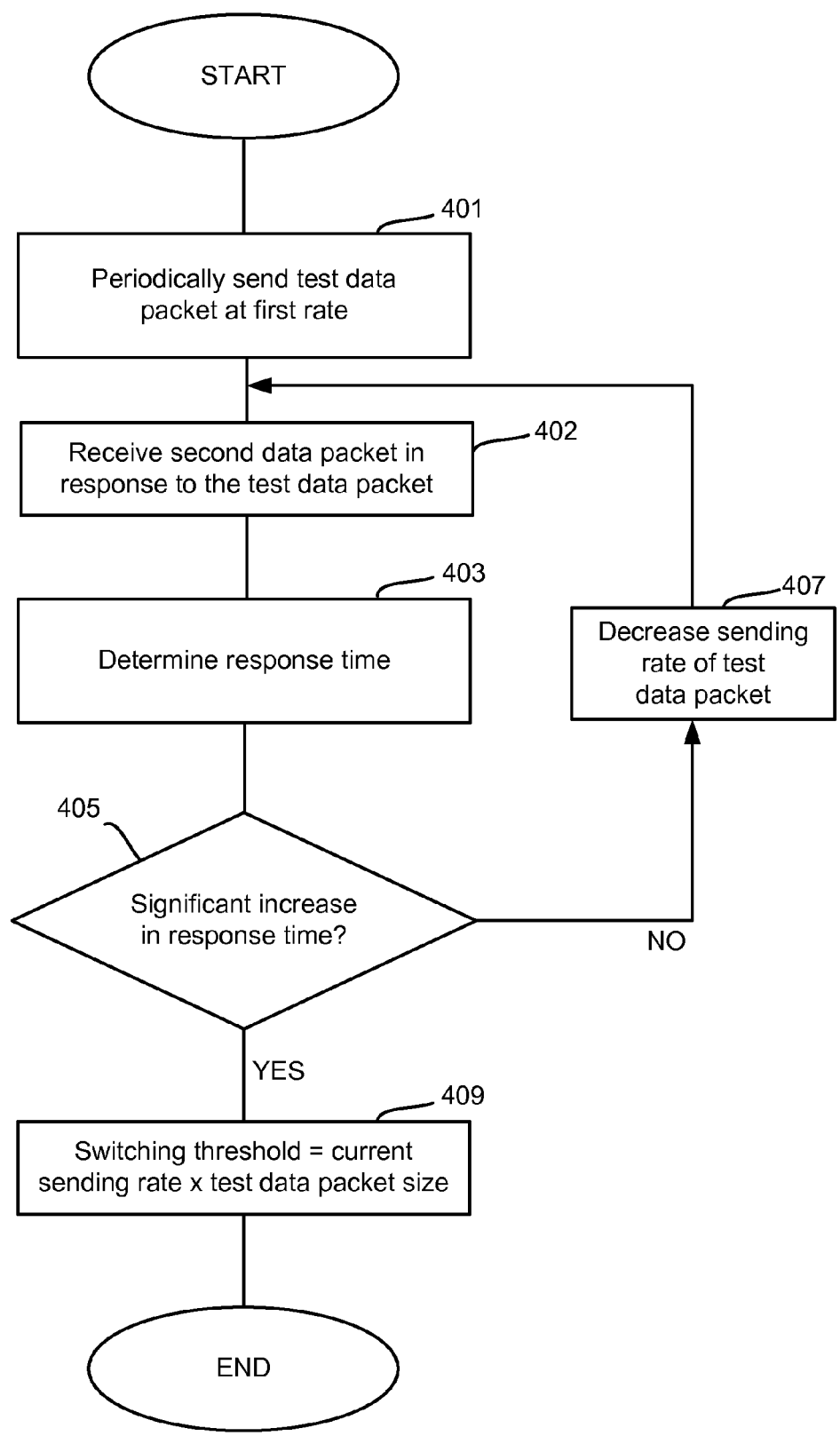
FIG. 4 shows a method according to another embodiment.

According to one embodiment the channel switching parameters may be determined using active measurements. FIG. 4 shows such an active measurement embodiment that is suitable for use with the channel switching parameters shown in FIG. 2, for example.

In step 401 the user equipment starts sending a test data packet periodically to another node in the network. The test data packet has a predetermined or known packet size. This may comprise "pinging" a test data packet to another node. The initial ping sending rate, i.e. the periodicity at which test data packets are sent, is chosen to be relatively high, for example above what the user equipment would expect to comfortably retain channel occupancy. For example a test data packet may be sent every 0.1 seconds. In step 402 a second data packet is received in response to the test data packet. In step 403 the response time of the pinged test data packet is determined, for example by calculating the difference in time of sending the test data packet and receiving the second data packet. The response time of the test data packet is compared with the response time of a previously sent test data packet, step 405, to determine whether the response time has changed by a set amount. For example, the response time is compared with a previous response time to determine whether the response time has become longer, i.e. an increase in the response time, which is indicative of the network having changed from a high speed channel (such as the dedicated transport channel) to a lower speed channel (such as the common transport channel).

If no significant increase in response time is detected, i.e. the response time has not changed by a set amount, then the rate at which the test packets are sent is decreased, step 407 (i.e. the time interval between separate test data packets increased), the response time determined again, steps 402 and 403, and compared with a previous response time in step 405 to determine whether there has been any significant increase in response time, i.e. the response time changed by a set amount. Steps 402, 403, 405 and 407 are repeated until such time as a change in the response time by a set amount is detected in step 405. The change in response time can then be used to determine the threshold value. For example, the threshold value Threshold-1 can be determined as:

Switching Threshold Value (Threshold-1)=sending rate x test data packet size

It is noted that the step of determining the threshold value relating to a channel switching parameter can be carried out each time a new communication is established on a given channel, or periodically during a communication session on a given channel. Alternatively, the threshold value may be carried out once for a given channel, and then stored so that it may be reused during a subsequent communication on that channel.

According to yet a further alternative, the determination of a threshold value of a channel switching parameter may be carried out prior to a communication session being established on that communication channel, for example whereby the threshold value is first determined, and a communication session on that channel established thereafter.

Figure 5:
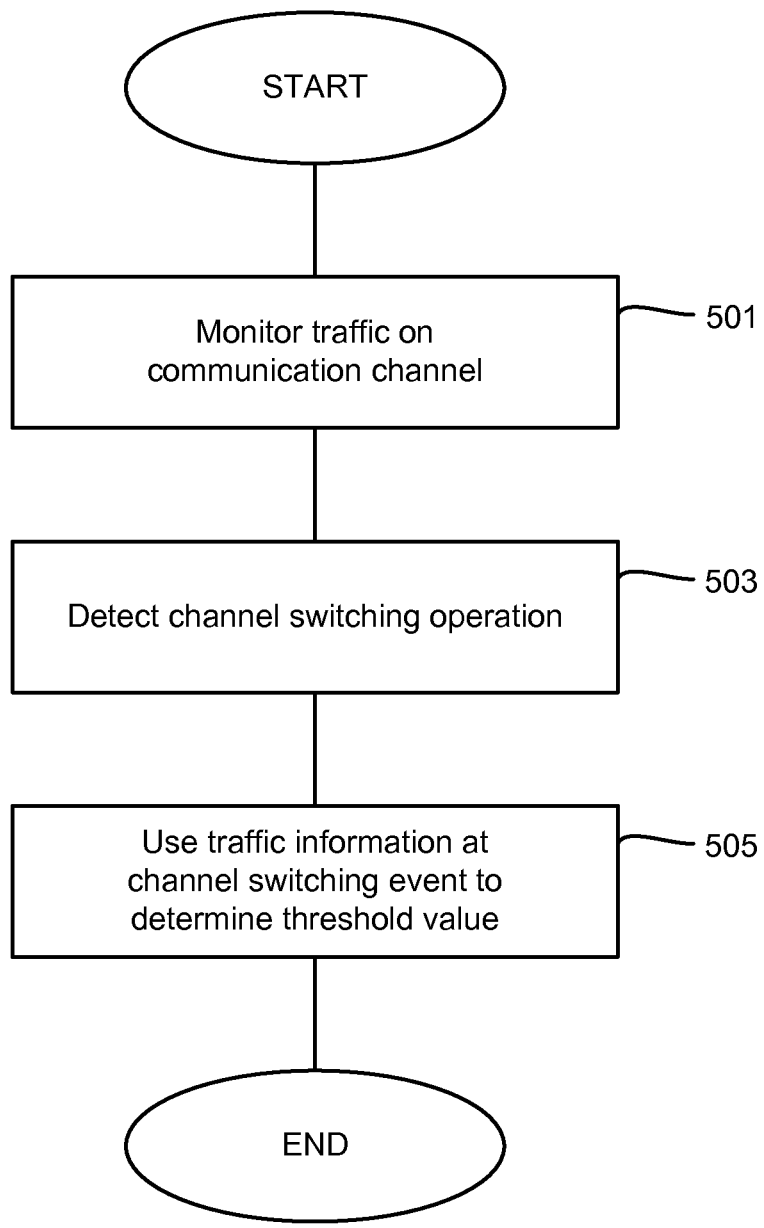
FIG. 5 shows a method according to another embodiment.

FIG. 5 shows an alternative embodiment in which passive measurements are used to determine the threshold value of a channel switching parameter.

The method monitors the parameters of the "normal" traffic passing through the radio interface, for example measured throughput, packet Inter Arrival Times (IATs) and Round Trip Time (RTT), and estimates the channel switching parameters accordingly. For example, the user equipment may be configured to monitor normal traffic on the communication channel, step 501, until a channel change occurs, i.e. a channel switching operation is detected in step 503. When a channel switching operation is detected, information relating to the traffic at that point in time, i.e. when the channel change occurred, is used to determine the corresponding threshold value or values relating to the channel switching operation, step 505 (i.e. working backwards and calculating the threshold level).

The monitoring of background traffic can also be used to adapt the generated additional traffic according to the existing traffic of the user terminal. If the throughput of the existing traffic is enough to keep up the high speed channel then no other traffic is needed to be generated. If the throughput of the existing traffic is less than the threshold value of a channel switching parameter then the necessary throughput, i.e. additional traffic, is needed to be generated.

Figure 6:
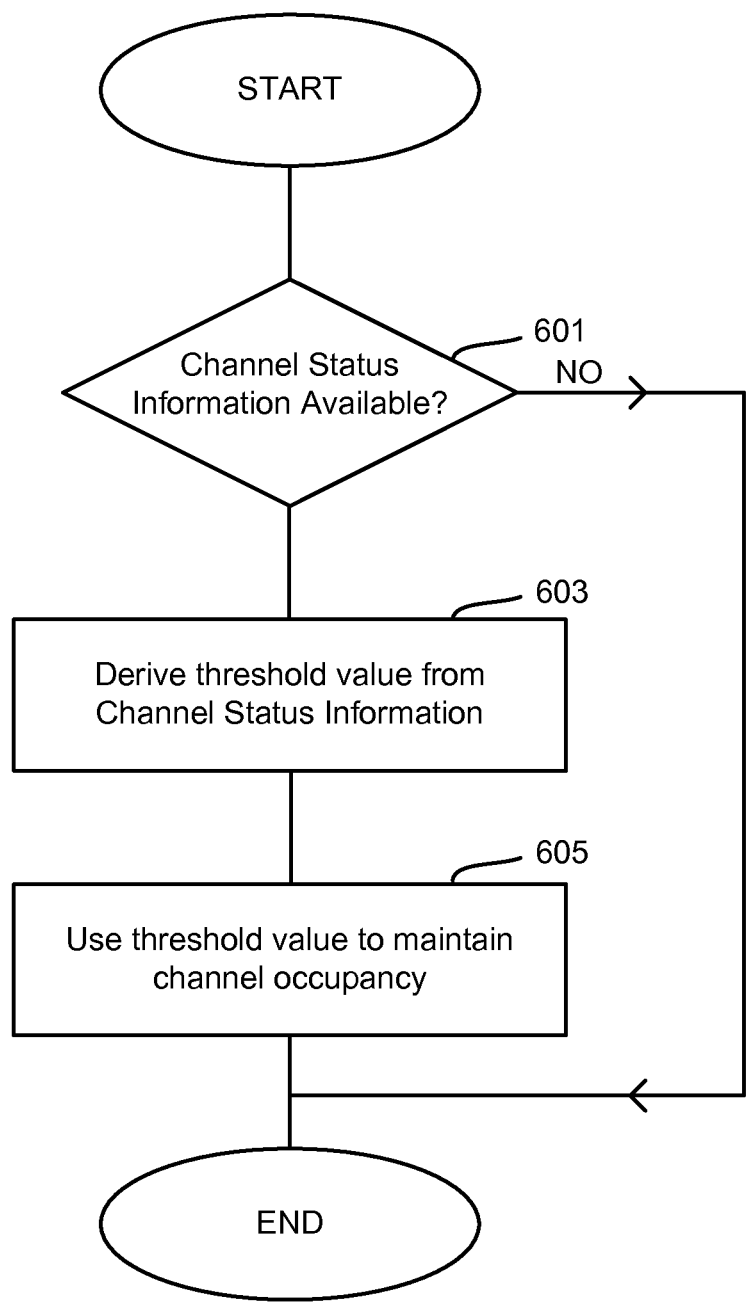
FIG. 6 shows a method according to another embodiment.

FIG. 6 shows an alternative embodiment for determining the threshold value of a channel switching parameter. According to the embodiment shown in FIG. 6, in step 601 the user equipment checks whether channel status information is currently available on the occupied channel. If it is determined in step 601 that such channel status information is available, the user equipment derives the threshold value from the channel status information, step 603. For example, the user equipment can query the mobile platform for such information, or ask the network about the thresholds being used for channel switching. The derived threshold value is then used to maintain channel occupancy, step 605, for example by providing the minimum traffic to maintain channel occupancy as described above.

Figure 7:
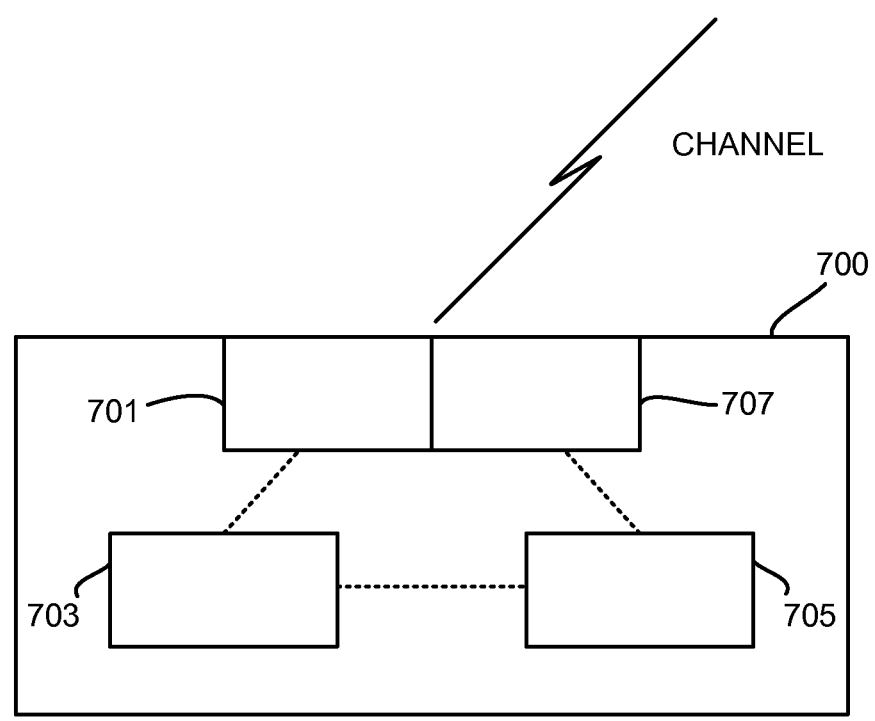
FIG. 7 shows a network entity according to an embodiment of the invention.

FIG. 7 describes a network entity 700, for example an user equipment, according to an embodiment of the invention. The network entity 700 comprises determining means 701 adapted to determine a threshold value relating to a channel switching parameter of a channel occupied by the entity. A monitoring unit 703 is adapted to monitor traffic of a communication via the occupied channel. A processing unit 705 is adapted to calculate, using the threshold value and the monitored traffic, what additional traffic is required to prevent the communication being switched from the occupied channel by the telecommunications network. An adding unit 707 is adapted to add the additional traffic to the channel comprising the communication. It will be appreciated, as noted above, that the network entity may be adapted or configured to perform certain operations more frequently than others. For example, the network entity may be adapted to perform the monitoring and processing aspects on a regular basis during a particular communication session, whereas the determining of the threshold value itself may be carried out on a less regular basis, or just once for a communication session, or prior to the communication session itself being started.

The additional traffic for maintaining occupancy of a particular channel may be generated in a number of ways, examples of which are described below.

According to one embodiment, the additional traffic may comprise random data, for example pings with properly set data size and/or timing. The size of the random data and/or the timing of the sending of random data are selectable. For example the amount of data to be sent and/or the timing of the data can depend on how much, or what form of additional data is required to maintain channel occupancy.

According to an alternative embodiment, the additional traffic may comprise repeating existing IP traffic, including data traffic and/or control traffic and/or status traffic. As above, the size of the repeated data traffic and/or the timing of the sending of the repeated data traffic are selectable. For example the amount of data to be sent and/or the timing of the data can depend on how much, or what form of additional data is required to maintain channel occupancy. An end-point can seamlessly discard the repeated data that has been sent.

According to an alternative embodiment, the additional traffic can be sent to, or received from, a dedicated server. For example, the uplink is more resource scarce in the Radio Access Network (RAN), and therefore a protocol can be defined which triggers downlink traffic having a specific throughput to the user terminal. For example, a user equipment can send a packet to a server requesting "send me 10 kbps throughput traffic", which triggers the server to send back packets with random data with a 10 kbps throughput. As above, the amount of data to be sent and/or the timing of the data can depend on how much, or what form of additional data is required to maintain channel occupancy.

According to another embodiment, an existing web server may be queried. However, the effect on the throughput of this technique is the most difficult to estimate (for example, the server response time can vary significantly, the content size can vary, the server may put the user equipment on a blacklist due to the number of queries).

The embodiments described above in relation to the first aspect of the invention have the advantage of being supported on the user equipment side, without requiring any modifications to the network side. The user equipment can maintain channel occupancy of a channel, for example a high speed channel, completely independent of the network by measuring (either passively or actively) the network traffic, estimating the parameters of the radio channel switching criteria and sending the minimal necessary background traffic accordingly.

As mentioned above, according to a second aspect of the invention, a network node is adapted to remove additional traffic that has been generated by an entity in the telecommunications network to maintain channel occupancy.

It is an incentive of the network operator to minimize cell load, while keeping user satisfaction at a maximum level, and while providing fair usage among the users. According to this aspect of the invention a network operator is able to determine the traffic which is deliberately generated by a network entity, for example a user terminal, to maintain occupancy of a channel such as a high speed communication channel for example a dedicated transport channel). In this case the traffic can be determined and shaped (for example removed or buffered), thereby decreasing the cell load and increasing the overall capacity.

The network node can apply a technique to counter the effect of the embodiments described in the first aspect of the invention, to filter out additional traffic that has been generated to maintain channel occupancy, thereby freeing up radio resources. The network node determines which traffic is responsible for the up keeping of the communication channel.

Figure 8:
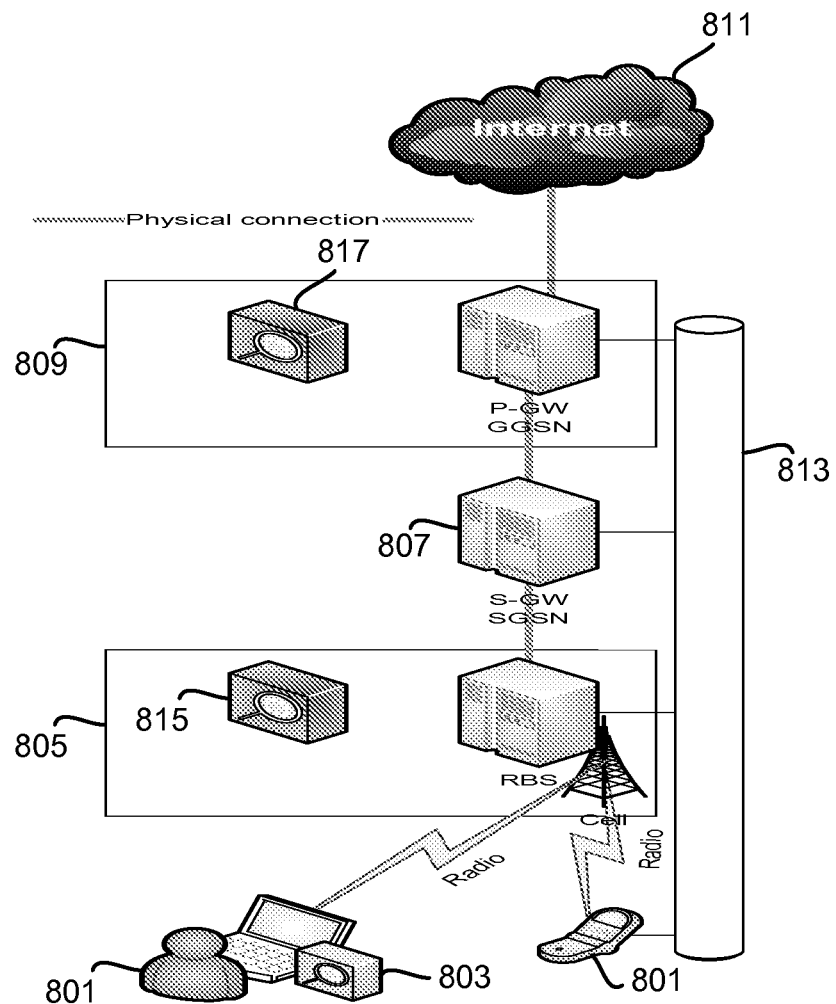
FIG. 8 shows a telecommunications network having an entity as shown in FIG. 7 and a traffic filter.

Referring to FIG. 8, a telecommunications network comprises user equipment 801, which may comprise means 803 for maintaining channel occupancy as described in the embodiments above. The telecommunications network also comprises a radio base station 805, a serving gateway 807 and a packet data network gateway 809, all of which will be familiar to those skilled in the art. Communication between a user equipment 801 and a core network 811, such as the Internet, is carried out by the radio base station 805, serving gateway 807 and the packet data network gateway 809 over a communication channel 813.

According to this aspect of the invention one or more traffic filters 815, 817 may be provided for filtering unwanted additional traffic from the communication channel. For example, a traffic filter 815 may be provided in a radio base station 805. In addition, or as an alternative, a traffic filter 817 may be provided in the packet data network gateway 809.

A traffic filter 815, 817 may be adapted to apply deep packet inspection (DPI) techniques to identify the type of traffic which maintains the channel occupancy. As will be familiar to a person skilled in the art, DPI enables a service provider to peer inside packets to establish information about the packets, and involves looking at the content or payload of a packet, rather than just the header of the packet.

In the case where traffic is identified as an interactive type, i.e. delay sensitive traffic such as streaming, VoIP or gaming, then the operator can allow the traffic to continue or even prioritize the traffic by issuing the traffic into a higher Quality of Service (QoS) class.

In the case where traffic is identified as a non-interactive type, i.e. non-delay sensitive traffic such as presence traffic of a VoIP client, then the traffic can be buffered and sent via a RACH-FACH (Random Access Channel-Forward Access Channel) or ERACH-FACH (Enhanced Random Access Channel-Forward Access Channel).

If the DPI technique is unable to determine the type of traffic which maintains the channel occupancy, then other procedures may be undertaken, for example based on prior agreement between a network operator and the user.

For example:

The traffic can be allowed to continue;

The traffic can be shaped, for example dropped or shaped back such that a RACH-FACH or ERACH-FACH channel is capable of transmitting the traffic without switch up to a dedicated transport channel. The intention is to counter the action of the additional traffic generated by the user equipment. The aim is to remove the invaluable traffic which does not deteriorate user satisfaction, but maintain the dedicated transport channel. As a result the user should fall back to the common transport channel;

The user can be informed that an unknown application is generating additional traffic which would be better for the network operator to be shaped. If the network operator agrees then this traffic will be shaped, if the user is willing to switch to another pricing format then the traffic is allowed to continue.

It is noted that, depending on the type of additional traffic that is used to maintain the channel occupancy, the task of the traffic filter for differentiating between different types of traffic is changed.

For example, in the different examples provided earlier in the application concerning the different formats the additional traffic can take, some of these formats may be easier to detect than others. For example, if the additional traffic is random data, then this can make it easier for the traffic filer to differentiate from normal traffic. The random data may be chosen such that it specifically makes the task of detection easier, for example by having a predetermined data pattern.

The other examples described above involving the repeating of a portion of existing traffic, or sending/receiving traffic to/from a dedicated server may also make the task of identifying such additional data easier for the traffic filter. It is noted, however, that providing additional data through the querying of a web server is more difficult to differentiate.

As mentioned above, the traffic filter and traffic filtering method can occupy one or more of several positions in the telecommunications network.

According to one embodiment, a Radio Network Controller (RNC) or Radio Base Station (RBS) is adapted to perform a traffic filtering operation. These nodes are aware of the occupied radio channels in the network, and are therefore well suited to perform the filtering method. However, because these nodes do not see into the user IP traffic up until the packet data network gateway, the functionality of these nodes need to be extended to enable the traffic filtering to be performed. Theoretically the first node in the network which sees the user IP packets is the gateway General Packet Radio Service (GPRS) Support Node (GGSN), or Packet data network GateWay (P-GW). Other nodes, such as the RBS, tunnel the user IP packets. Therefore, in practice, nodes such as the RBS will need to tunnel into the user's IP packets in order to determine the contents thereof.

According to another embodiment, a P-GW or GGSN is adapted to perform a traffic filtering operation. Since the user plane traffic is de-capsulated, the DPI technique is straightforward to perform at this node. The lack of radio related information can be supplied by similar passive measurements as mentioned above.

FIG. 8 therefore shows a telecommunications system comprising an entity as described in any one of the embodiments described above and a traffic filter, for example as described in the embodiment below.

Figure 9:
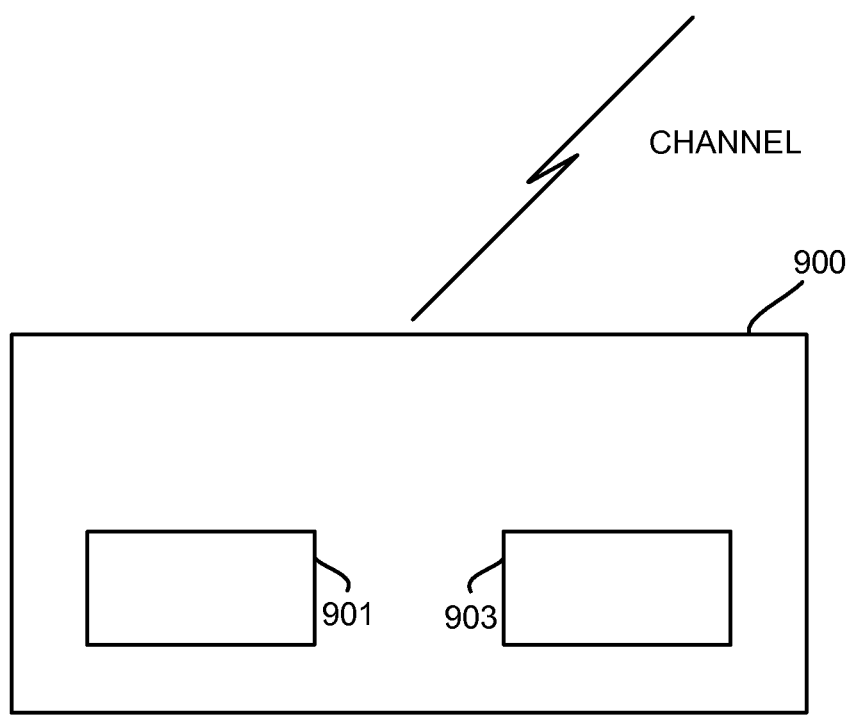
FIG. 9 shows the traffic filter of FIG. 8 in greater detail.

FIG. 9 shows further details of a traffic filter 815, 817 of FIG. 8 according to an embodiment of the invention. In FIG. 9 the traffic filter 900 comprises a detecting unit 901 adapted to detect additional traffic on a communication channel, the additional traffic relating to traffic that is being used to maintain occupancy of the communication channel. The traffic filter 900 also comprises a filter unit 903 adapted to filter the additional traffic from the communication channel. The detecting unit 901 comprises, for example, a deep packet inspection unit for inspecting packets as described above, and an identifying unit for identifying the additional traffic from standard traffic, as described above.

The embodiments described above under the first aspect of the invention have the advantage of enabling users to join gaming servers, use VoIP while minimizing the cost of sent data (for example battery power, cost of data). The embodiments of the first aspect of the invention can also be realised by adapting the user equipment alone, without necessarily requiring any modification on the network side, thereby being network and operator independent.

The embodiments described above under the second aspect of the invention have the advantage of enabling operators to increase the cell capacity by decreasing the occupancy of high speed channels, and consequently increasing the number of served users.

Figure 1:
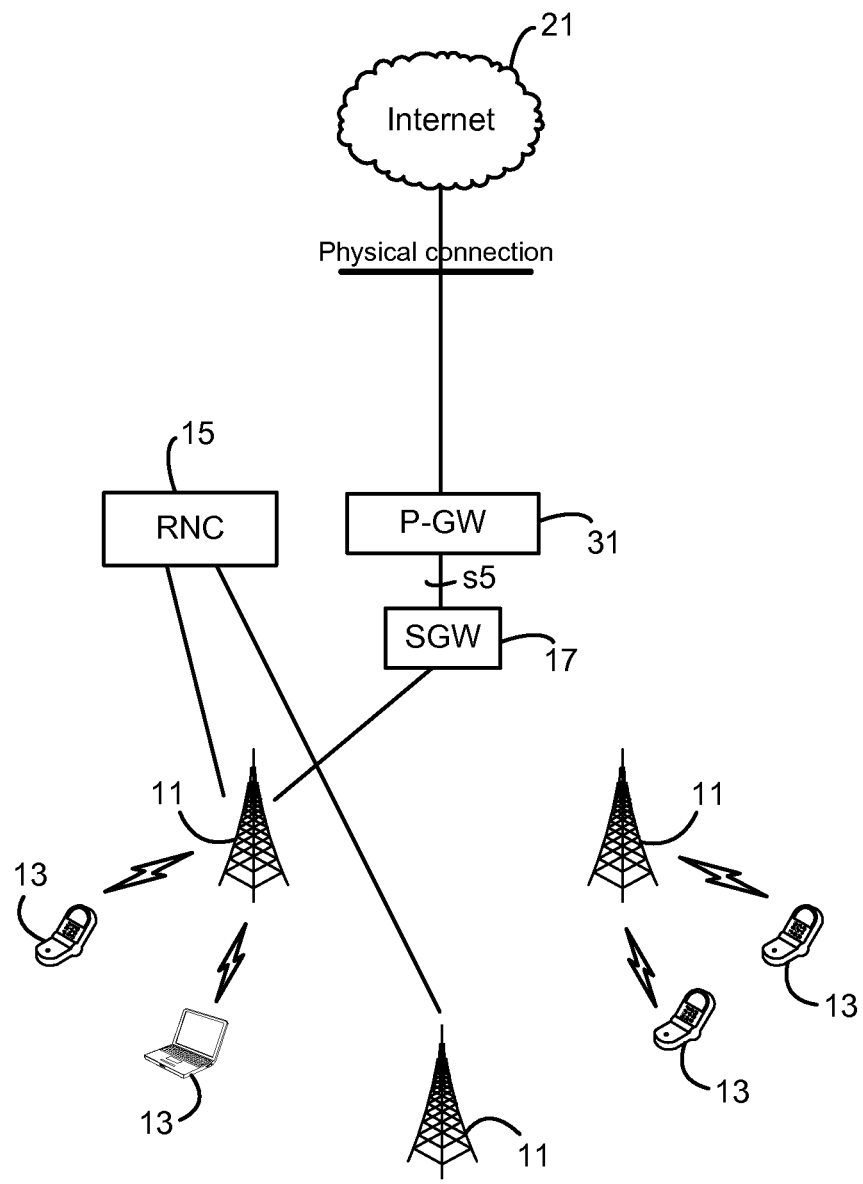
FIG. 1 shows an overview of some of the components in a telecommunications network.
Figure 2:
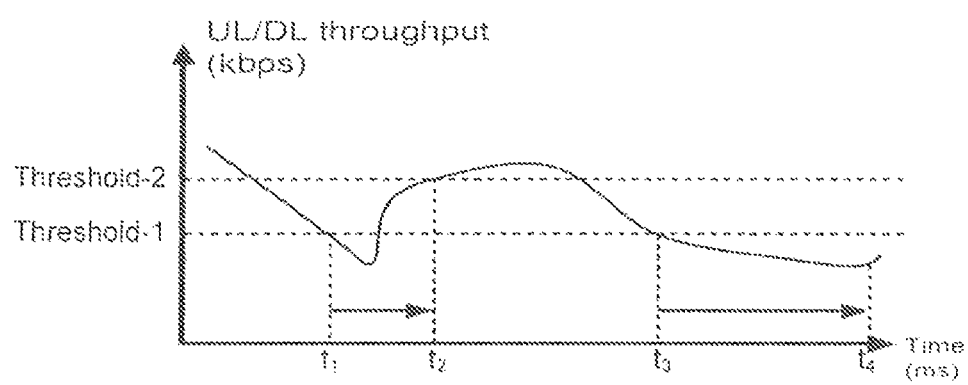
FIG. 2 shows an example of a prior art channel switching operation.

Although some of the embodiments above have been described in relation to a channel switching operation that involves multiple thresholds and a timer as shown in FIG. 2, it is noted that the embodiments may be used with other forms of channel switching algorithms including, but not limited to, channel switching algorithms that use a simple single threshold value.

Although some of the embodiments have been described in relation to a user equipment or a method in a user equipment, such embodiments can also apply to other network entities, or methods performed in other network entities, for example a network entity or node that does not have knowledge of the threshold values used to switch communication channels.

The embodiments above have been described in relation to determining a threshold value of a channel switching parameter. It will be appreciated, however, that the invention is intended to embrace any number of threshold values being determined, in relation to any number of channel switching parameters.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for maintaining a communication channel for an entity in a telecommunications network, the method comprising:

determining a threshold value relating to a channel switching parameter of a channel occupied by the entity;

monitoring traffic of a communication via the occupied channel;

calculating, using the threshold value and the monitored traffic, what additional traffic is required to prevent the communication from being switched from the occupied channel by the telecommunications network; and adding the additional traffic to the channel comprising the communication, wherein determining the threshold value comprises:
periodically sending a test data packet to another node at a first rate, the test data packet having a predetermined packet size;
receiving a second data packet in response to the test data packet;
determining a response time by calculating a difference in time of sending the test data packet and receiving the second data packet;
comparing the determined response time with a previous response time of a previously sent test data packet;
if the determined response time has changed relative to the previous response time by a set amount or less, periodically sending the test data packet at a decreased sending rate; and
if the determined response time has changed relative to the previous response time by more than the set amount, determining the threshold value using the predetermined packet size and a current sending rate.

2. The method of claim 1, wherein determining the threshold value comprises deriving the threshold value from current channel status information.

3. The method of claim 1, wherein adding the additional traffic to the channel comprises sending the additional traffic from the entity to another node of the telecommunications network via the occupied channel.

4. The method of claim 3:
wherein the additional traffic comprises at least one of:
random data;
a repeated portion of existing data traffic;
additional control traffic; and
status traffic;
wherein at least one of the size of the additional traffic and the timing of the sending of the additional traffic is selectable.

5. The method of claim 1, wherein adding the additional traffic comprises triggering the additional traffic to be sent from another node of the telecommunications network to the entity via the occupied channel.

6. The method of claim 5:
wherein the additional traffic comprises at least one of:
random data;
a repeated portion of existing data traffic;
additional control traffic; and
status traffic;
wherein at least one of the size of the additional traffic and the timing of the sending of the additional traffic is selectable.

7. The method of claim 1, wherein the channel switching parameter relates to one or more parameters for switching between a dedicated transport channel and a common transport channel.

8. The method of claim 1, wherein the entity comprises a user equipment of the telecommunications network, or a node of the telecommunications network that does not have knowledge of the threshold value.

9. An entity in a telecommunications network, the entity comprising:
a threshold determining unit configured to determine a threshold value relating to a channel switching parameter of a channel occupied by the entity;
a monitoring unit configured to monitor traffic of a communication via the occupied channel;
a processing unit configured to calculate, using the threshold value and the monitored traffic, what additional traffic is required to prevent the communication being switched from the occupied channel by the telecommunications network; and
an adding unit configured to add the additional traffic to the channel comprising the communication,
wherein the threshold determining unit comprises:
a sending unit configured to periodically send a test data packet to another node at a first rate, the test data packet having a predetermined packet size;
a receiving unit configured to receive a second data packet in response to the test data packet;
a time determining unit configured to determine the response time by calculating a difference in time of sending the test data packet and receiving the second data packet; and
a comparing unit configured to compare the determined response time with a previous response time of a previously sent test data packet;
wherein the threshold determining unit is further configured to decrease a sending rate of the test data packets until the determined response time has changed relative to the previous response time by a set amount or less, and thereafter calculate the threshold value using the predetermined packet size and a current sending rate.

10. The entity of claim 9, further comprising a sending unit configured to send the additional traffic from the entity to another node of the telecommunications network via the occupied channel.

11. The entity of claim 10, wherein the sending unit is configured to send additional traffic comprising at least one of:
random data having a predetermined data size;
a copy of a portion of existing data traffic;
control traffic; and
status traffic.

12. A traffic filter for a node of a telecommunications network, the traffic filter comprising:
a detecting unit configured to detect additional traffic on a communication channel, the additional traffic being in addition to other desired traffic on the communication channel and comprising traffic added to the communication channel to maintain a current occupancy of the communication channel; and
a filtering unit configured to remove and discard the additional traffic from the communication channel,
wherein an amount of the additional traffic is determined based on a threshold value, and
wherein the threshold value is determined by:
determining a response time by calculating a difference in time between when a test data packet was sent to another node and when a second data packet is received in response to the test data packet;
comparing the determined response time with a previous response time of a previously sent test data packet;
if the determined response time has changed relative to the previous response time by a set amount or less, periodically sending the test data packet at a decreased sending rate; and
if the determined response time has changed relative to the previous response time by more than the set amount, determining the threshold value using the predetermined packet size and a current sending rate.

13. The traffic filter of claim 12, wherein the detecting unit comprises:
a deep packet inspection unit configured to inspect packets; and an identifying unit configured to identify the additional traffic from standard traffic.

14. A telecommunications system comprising:

an entity comprising:
- a threshold determining unit configured to determine a threshold value relating to a channel switching parameter of a channel occupied by the entity;
- a monitoring unit configured to monitor traffic of a communication via the occupied channel;
- a processing unit configured to calculate, using the threshold value and the monitored traffic, what additional traffic is required to prevent the communication being switched from the occupied channel by the telecommunications network; and
- an adding unit configured to add the additional traffic to the channel comprising the communication; and a traffic filter comprising:
- a detecting unit configured to detect additional traffic on a communication channel, the additional traffic relating to traffic being used to maintain occupancy of the communication channel; and
- a filtering unit configured to filter the additional traffic from the communication channel, wherein the threshold determining unit comprises
- a sending unit configured to periodically send a test data packet to another node at a first rate, the test data packet having a predetermined packet size;
- a receiving unit configured to receive a second data packet in response to the test data packet;
- a time determining unit configured to determine the response time by calculating a difference in time of sending the test data packet and receiving the second data packet; and
- a comparing unit configured to compare the determined response time with a previous response time of a previously sent test data packet;

wherein the threshold determining unit is further configured to decrease a sending rate of the test data packets until the determined response time has changed relative to the previous response time by a set amount or less, and thereafter calculate the threshold value using the predetermined packet size and a current sending rate.

15. The telecommunications system of claim 14, wherein the detecting unit comprises:
- a deep packet inspection unit configured to inspect packets; and
- an identifying unit configured to identify the additional traffic from standard traffic.

\* \* \* \* \*